July 19, 1932.  O. G. RIESKE  1,868,255
FISH CUTTING MACHINE
Filed Nov. 29, 1929  2 Sheets-Sheet 1
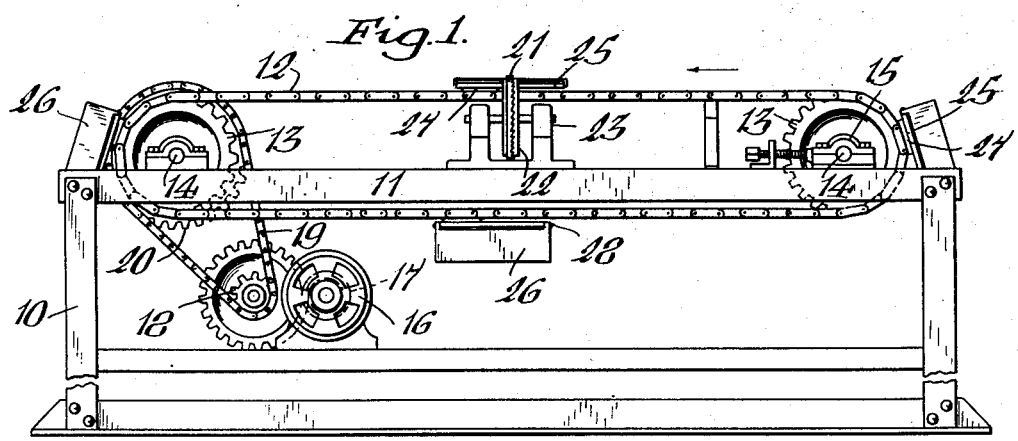
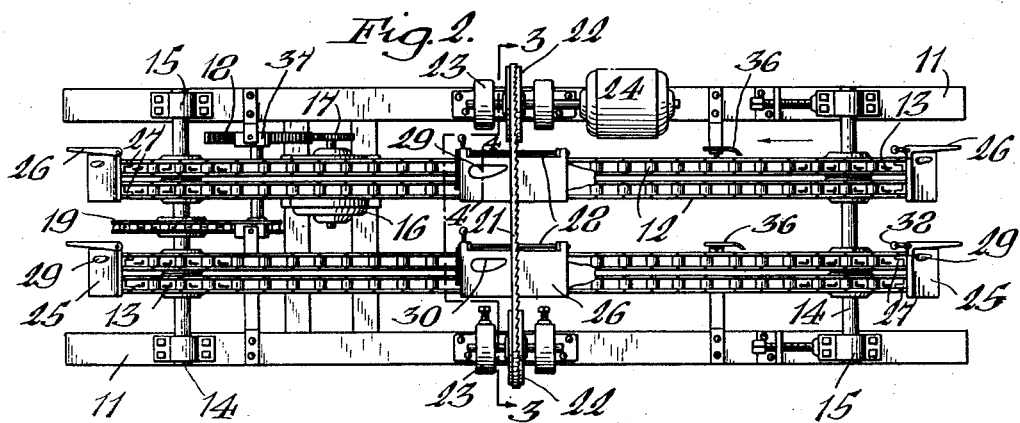
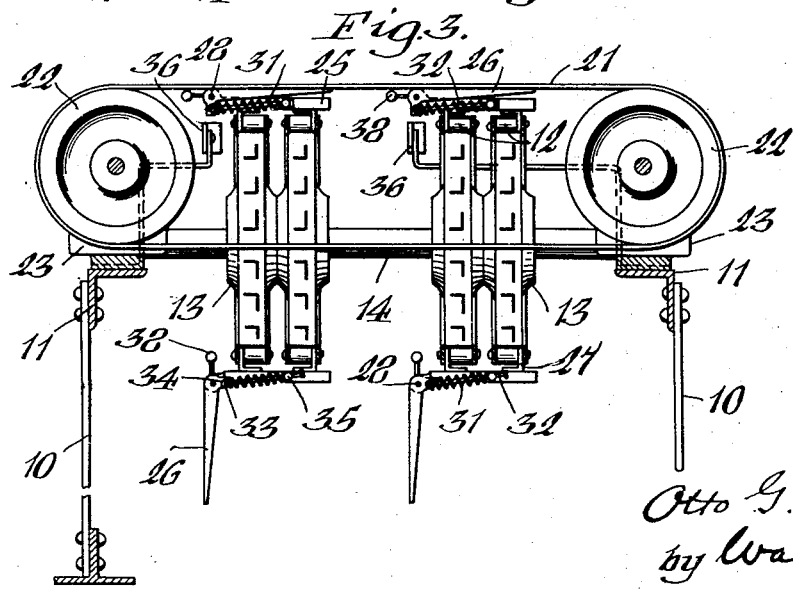
Inventor,
Otto G. Rieske
by Walter P. Guyer
Attorney.

July 19, 1932.   O. G. RIESKE   1,868,255
FISH CUTTING MACHINE
Filed Nov. 29, 1929   2 Sheets-Sheet 2
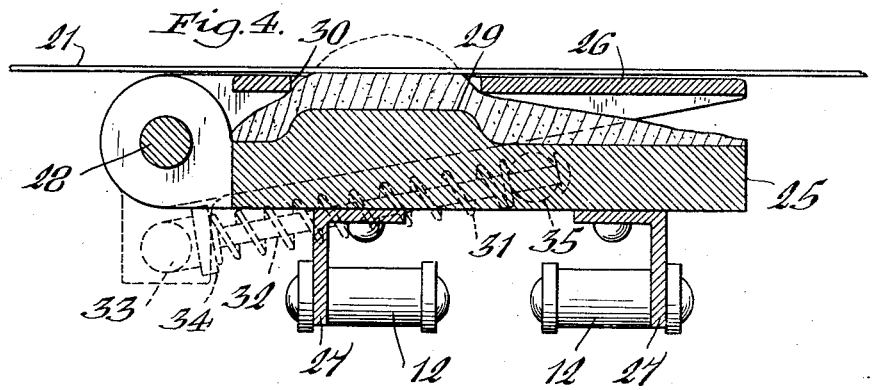
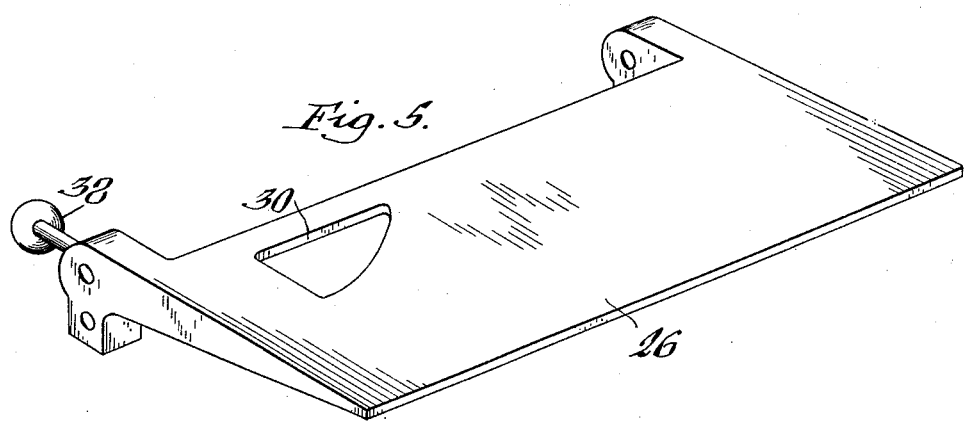
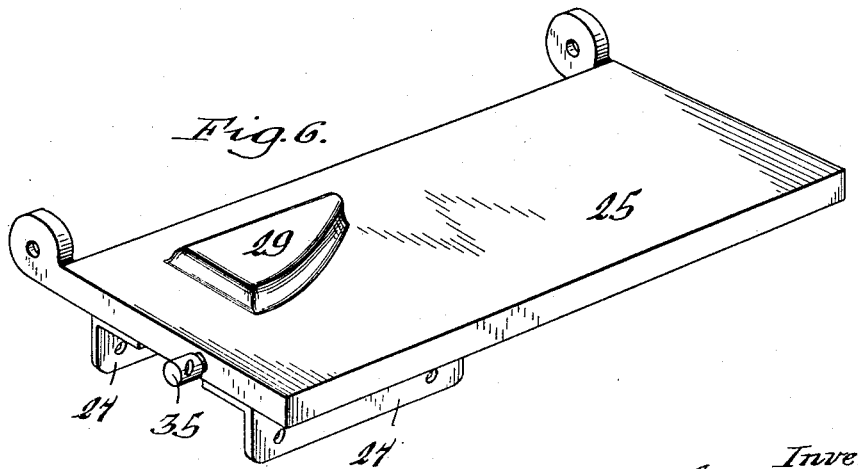
Inventor,
Otto G. Rieske,
by Walter P. Geyer
Attorney.

Patented July 19, 1932

1,868,255

UNITED STATES PATENT OFFICE

OTTO G. RIESKE, OF BUFFALO, NEW YORK

FISH CUTTING MACHINE

Application filed November 29, 1929. Serial No. 410,303.

This invention relates to a cutting machine which has been designed more particularly for severing the nape or rib bone from the body of a fish.

One of its objects is to provide a practical and efficient machine of this character by which the nape bones of fish can be expeditiously severed with a minimum of waste.

Another object of the invention is to provide the machine with holders for the fish which are constructed to effect the protrusion therefrom of the portion of the fish to be severed.

In the accompanying drawings:—

Figure 1 is a side view of a fish cutting machine embodying my invention. Figure 2 is a top plan view thereof. Figure 3 is an enlarged fragmentary transverse section taken on line 3—3, Figure 2. Figure 4 is an enlarged cross section through one of the holders or carriers, taken in the plane of line 4—4, Figure 2. Figure 5 is a perspective view of the cover plate of the holder. Figure 6 is a similiar view of the base plate thereof.

Similar characters of reference indicate corresponding parts throughout the several views.

The working parts of the machine may be supported on a suitable frame of any appropriate construction, that shown in the drawings including legs 10 and spaced longitudinal beams 11. Mounted on this frame are one or more conveyor mechanisms having holders or carriers for the fish attached thereto which successively present the fish to a suitable cutter blade disposed in the path of travel of said holder for severing the nape or rib bone therefrom. Each of these conveyors consists of two endless chains 12 disposed paralled to each other lengthwise of the frame and passing around sprocket wheels 13 mounted on corresponding transverse shafts 14 journaled in bearings 15 secured to opposite ends of the frame beams 11. Both of these chains are driven in unison at a comparatively slow speed by an electric motor 16 or other source of power, the motor shown in the drawings having speed-reducing gears 17, 18 connected by a sprocket chain 19 with a sprocket wheel 20 fixed on one of the shafts 14. These conveyor chains are driven in a counter-clockwise direction toward a suitable cutter blade 21 which extends transversely above the upper stretches of the chains. This cutter blade is, by preference, in the form of an endless band passing at its ends around pulleys 22 journaled in suitable bearings 23 on the frame and driven by an electric motor 24 or otherwise. If the machine is provided with more than one conveyor mechanism, as in the one depicted in the drawings, the one cutter blade serves for all.

Applied to the conveyor chains 12 at suitable intervals thereon are a plurality of fish-holders or carriers which successively present the fish to the cutter blade 21. Each of these holders is preferably composed of two sections or walls 25, 26 between which the fish is held and from which that portion of the fish to be severed, viz., the nape bone, is adapted to protrude, the remaining portion of the fish being housed within the holder. The section 25 constitutes the base plate of the holder on which the fish is laid and which has attaching flanges 27 for detachably securing it to the parallel conveyor chains 12. The section 26 is movable toward and from the base plate to clamp the fish thereto and to release it therefrom and thereby constitutes a cover which is preferably mounted for vertically-swinging movement transversely of the conveyor and hinged at 28 to the base plate. On its top side the latter has a raised surface or projection 29 of the proper shape to raise the nape-bone portion of the fish above its body when the fish is placed on the holder preparatory to being severed. The cover plate 26 has a similarly shaped opening 30 therein adapted to register with the projection on the companion plate 25 in the closed position of said cover and through which the nape-bone portion of the fish is adapted to protrude and be severed by the cutter blade 21 as the holder travels past it.

The cover plate of the holder is yieldingly held in its closed or open position by a coil spring 31 which may be applied to a tie rod or link 32 joined at one end to a pivot pin 33 mounted on a depending bracket 34 applied to the hinged end of the cover plate below the axis of the hinge-pintle 28. The other end of this tie rod is slidably fitted in a revolving guide pin 35 mounted on the base plate 25 and likewise disposed below the axis of the hinge-pintle, as seen in Figure 4. By this construction, the spring 31 not only holds the cover plate yieldingly closed but it also, by reason of the disposition of its link 32 with reference to the hinge-pintle 28, acts to hold said cover plate in its open position. When the cover is partially opened or closed, the spring functions to automatically complete the opening or closing thereof.

While the cover of the holder may be opened or closed by hand to insert and remove a fish, I have shown means for automatically effecting such movement. These means consist of trip devices 36, 37 disposed on opposite sides of the cutter blade 21 and along one side of the conveyor chains 12 and a tappet 38 projecting from the rear edge of the cover plate for engagement with said trip devices as the holders travel past them. When the tappet encounters the trip 36, which is subsequent to the act of placing the fish on the base plate 25 of the holder, the cover is swung downwardly to a point where the spring 31 acts to automatically effect its complete closure. Likewise, when the tappet strikes the strip 37, which is after the nape-bone has been severed from the fish, the cover is partially opened to a point where the spring again acts to automatically effect its complete opening, permitting the fish to be removed or dropped into a suitable receptacle provided for receiving it.

It is to be understood that my invention is not limited to the exact details of construction herein shown and described, as various changes therein and modifications thereof may be made within the scope of the appended claims without departing from the spirit of the invention or sacrificing any of its advantages.

I claim as my invention:—

1. In a machine of the character described, a traveling carrier for the fish including a pair of relatively movable walls for receiving a fish between them, one of said walls having an opening therein through which a portion of the fish is adapted to protrude and the other wall having a part thereon for raising such portion through the companion wall-opening, and means for severing the protruded portion of the fish from its body.

2. In a machine of the character described, a cutter blade, a conveyor movable past said blade, and a carrier for a fish mounted on said conveyor and including a pair of relatively movable walls for receiving the fish between them, one of said walls having a projection thereon and the other having an opening therein to receive said projection in the closed position of the carrier, said blade being disposed across the path of travel of the carrier to sever that portion of the fish protruded therefrom by the companion projection and opening in said carrier walls.

3. In a machine of the character described, a cutter blade, a conveyor movable past said blade, a carrier for a fish mounted on said conveyor and including opposing walls adapted to receive a fish between them, and from which a portion of the fish is adapted to laterally protrude, one of said walls being movable toward and from the other to close and open the carrier, respectively such protruded portion of the fish being severed from its body as the carrier travels past the cutter blade, and means for automatically closing said movable wall before the carrier reaches the cutter blade and for automatically opening said wall after it passes said blade.

4. In a machine of the character described, a cutter blade, a conveyor movable past said blade, a carrier for a fish mounted on said conveyor and including a bottom plate and a cover plate movable toward and from the same, said cover plate having an opening therein through which a portion of the fish is adapted to protrude, such protruded portion of the fish being severed from its body as the carrier travels past the cutter blade, and means for automatically closing and opening the cover plate before and after the carrier passes said blade, respectively.

5. In a machine of the character described, a cutter blade, a conveyor movable past said blade, a carrier for a fish mounted on said conveyor and including a bottom plate and a cover plate hinged thereto to move toward and from the same, said cover plate having a projection at its hinged end and an opening in its body through which a portion of the fish is adapted to protrude, such protruded portion of the fish being severed as the carrier travels past the cutter blade, and a trip device disposed alongside the conveyor at either side of the cutter blade and in the path of travel of said cover plate projection for automatically effecting the closing and opening movements of said cover plate.

6. A fish-holder of the character described, comprising a base plate having a raised surface thereon over which a fish is adapted to lie, and a cover plate hinged to said base plate and having a registering opening therein opposite the raised surface of the base plate and through which the overlying portion of the fish is adapted to protrude.

7. A fish-holder, comprising a base plate having a raised surface thereon and over which a fish is adapted to lie, a cover plate hinged to said base plate and having an opening opposite the raised surface of the base plate and through which the overlying portion of the fish is adapted to protrude, and means for yieldingly holding the cover plate in its closed position over the base plate.

OTTO G. RIESKE.